United States Patent
Thingstad et al.

[15] 3,648,378
[45] Mar. 14, 1972

[54] ARRANGEMENTS IN AN EXTENSIBLE AIR-BUBBLE-TYPE LEVEL

[72] Inventors: Hans Kristian Thingstad, Fornhojdsvagen 13; Horst Jurgensen, Sveagatan 19, both of Sodertalje, Sweden

[22] Filed: July 17, 1970

[21] Appl. No.: 56,248

[30] Foreign Application Priority Data

Dec. 14, 1967 Sweden..............................17,157/67

[52] U.S. Cl..............................................................33/208
[51] Int. Cl.........................................................G01c 9/00
[58] Field of Search.....................................................33/208

[56] References Cited

UNITED STATES PATENTS 1,074,367   9/1913   Keefauver................................33/208

*Primary Examiner*—Leonard Forman
*Assistant Examiner*—Charles E. Phillips
*Attorney*—Eric Y. Munson

[57] ABSTRACT

An air bubble level having a main portion of generally I-shaped cross section which is engaged by extensible members partly surrounding the main portion and which can be clamped in various extended positions by clamping means located within the extensible means and cooperating with a plate located in the main portion of the level so that actuation of the clamping means will move the plate and cause the extensible members to be raised and clamped against the main portion.

1 Claims, 4 Drawing Figures

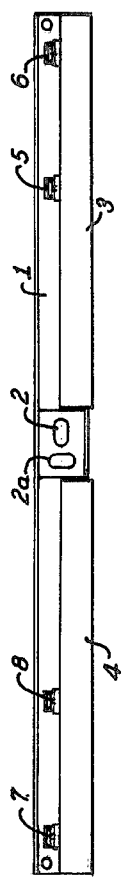
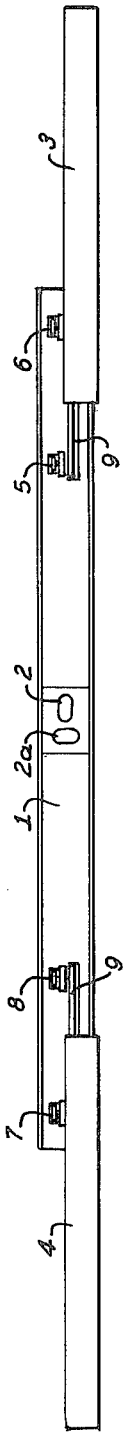
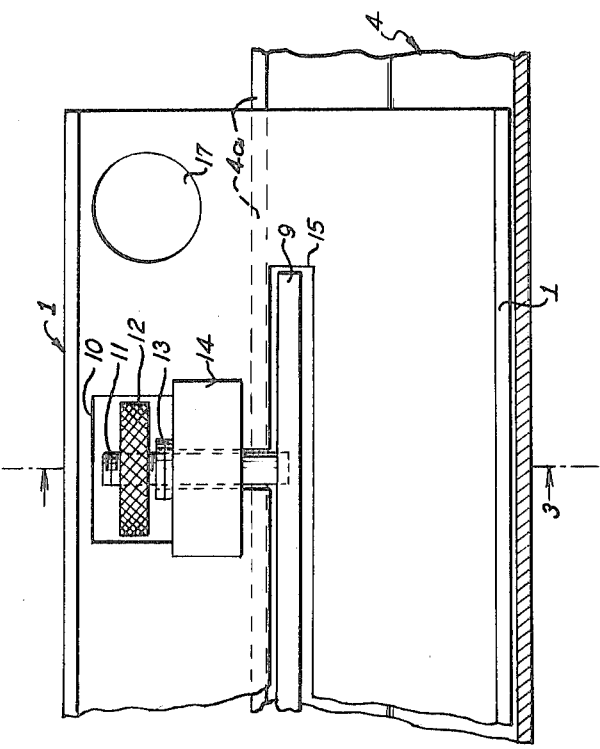
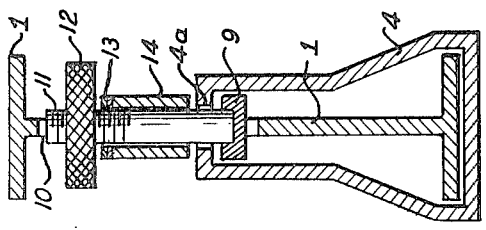

ARRANGEMENTS IN AN EXTENSIBLE AIR-BUBBLE-TYPE LEVEL

This is a continuation of application Ser. No. 778,627, now abandoned.

The present invention has as its object to provide one or more extensible means especially intended to be used together with an air bubble type level or the like. In case such an extensible mean shall be applicable onto a level, this level may consist of a main part, which has a cross section essentially in the form of an "I." The main part shall in such case carry the air bubble devices and one or more clamping devices in order to clamp the extensible part onto or toward the main part.

BACKGROUND OF THE INVENTION

Levels of the above stated form have been constructed in order to fullfill different objects and as an example reference is made to the device shown in the U.S. Pat. No. 686,360. This level has extensible means or parts. The shown level has recesses in the main part and in each recess each extensible means or part can be placed. Such level will, because of the complicated construction of the main part, be expensive in construction and is bulky to handle.

In the U.S. Pat. No. 1,177,709 is shown another level having extensible means or parts. The extensible means or parts are intended to be placed in a side by side relation and also it is necessary to form the main part with longitudinally directed recesses, in which the extensible parts shall be placed. Moreover the level according to the last-mentioned U.S. Patent shows a very complicated device in order to place or adjust the extensible part in an arbitrary position.

The present invention has for its object to provide a level with extensible means and which main object is to provide a very simple construction of the main part and at the same time the extensible parts can very easily be removed in case the need of extensible parts fails. The special construction according to the present invention makes its possible to use the level even if the extensible part are not employed.

With these and other objects in view the present invention consists in the combination arrangement of parts, as will be hereinafter more fully described, shown in the accompanying drawings, and particularly pointed out in the appended claims. In the drawings, FIG. 1 shows an air bubble type level with extensible means movable towards each other.

FIG. 2 shows the level with the extensible means in extensible position.

FIG. 3 shows a section through the level adjacent the clamping device for the extensible means, taken along the line III—III of FIG. 4, and FIG. 4 shows the clamping device according to FIG. 3 in a side view.

In the attached drawing is shown a level which has a main part 1. The main part 1 has a cross section essentially in the form of an "I." The main part 1 carries air bubbles 2 and 2A and clamping devices in order to clamp the extensible means 3, 4 to the main part 1 in a desired position. In order to clamp the extensible part 3 onto or towards the main part 1 two different clamping devices 5 and 6 are shown and for the clamping of the extensible part 4 onto or towards the main part 1 two clamping devices 7 and 8 are shown.

FIG. 2 shows how the extended parts are retained in an extensible position by the two sets of clamping devices, for example the clamping devices 7 and 8 which have a common clamping plate 9 which cooperates with a clamping block 14 in each of the devices 7 and 8. The clamping of the extensible part 4 is achieved by lifting the extensible part to cooperate with the clamping block 14 on the main part 1.

In FIG. 3 is shown a side elevational view of an air bubble type level constructed according to FIG. 1 and 2 and in which Figure the clamping devices are shown more in detail. The clamping device, which may be the same for all clamping devices shown in FIGS. 1 and 2 will be described and only the clamping device 7 is shown. The clamping device 7 is arranged in a recess 10 in the main part. The clamping device 7 consists of an externally threaded screw 11, which screw 11 cooperates with an internally threaded round nut 12. The nut 12 rests on washers 13 made of steel, which in turn rest on a block 14 which is secured to the main part 1. By turning the nut 12 the screw can be moved upward or clamping relatively downward to the main part 1. The lower part of the screw 11 cooperates with a clamping relatively plate 9, which is only shown schematically in FIG. 2.

The extensible part 4 is constructed to surround a part of the main part 1 including the bottom section. The clamping plate 9, which cooperates with the clamping device 7 is placed inside the extensible part 4 adjacent the clamping device 7. The part of the extensible device 4 which is fastened by the clamping device 7 has a slot 4a in order to be moved to cooperation with the main part 1.

The surface of the main part 1, which faces the extensible part may be plain and at the same time the surface of the extensible part which faces the main part 1 may also be plain. By such arrangement an actuation of the fastening device will move the plate 9 so the extensible part 4 will be lifted up toward the main part 1 clamping the slotted section of the extensible part between the top surface of the clamping plate 9 and the bottom surface of the block.

It may be desirable that the plate 9 be placed in a slot 15 in the main part 1 in which case one plate 9 may serve two clamping devices 7 and 8 adjacent each other.

For the purpose of keeping the weight of the main part low the main part may be provided with holes or recesses 17, which recesses may serve even other purposes.

Having thus set forth and disclosed the nature of this invention, what is claimed is:

1. An air bubble type level comprising an elongated main body having a cross-sectional I-shape with flanged opposite sides and at least one extension element slidably adjustable along the length of the main body for increasing or decreasing the effective length of said level, said extension element including a longitudinally extending chamber and a longitudinally extending slot in one side thereof communicating with said chamber to slidably accommodate a portion of the main body including one of said flanges within it, the remainder of the main body including the other flange being located externally of the extension element and the side of said extension element opposite said slot being flat to contact surfaces to be tested, a first aperture in the portion of the main body within said extension element, a clamping plate positioned in said first aperture and having a width greater than that of said slot, said plate extending parallel to the chamber of said extension element, a block member secured to the main body externally of the extension element adjacent the side of the extension element containing said slot, a second aperture in the main body adjacent said block member opposite said extension element, a screw member passing through the second plate and the slot in said extension element and engaging the clamping plate, and a nut in said second aperture adjustable on the screw member for drawing said clamping plate against the interior surface of said chamber adjacent said slot and the exterior surface of said extensible element against said block member whereby said extensible element is clamped in position without distorting the flat surface of said extensible element.

* * * * *